United States Patent [19]
Takeuchi et al.

[11] Patent Number: 6,000,766
[45] Date of Patent: Dec. 14, 1999

[54] CRAWLER BELT APPARATUS

[75] Inventors: Masashi Takeuchi; Masayuki Yamamoto, both of Wako, Japan

[73] Assignee: Honda Giken Kogyo Kabushiki Kaisha, Tokyo, Japan

[21] Appl. No.: 08/881,327

[22] Filed: Jun. 24, 1997

[30] Foreign Application Priority Data

Jun. 25, 1996 [JP] Japan ................................. 8-164627

[51] Int. Cl.⁶ ................................................ B62D 55/088
[52] U.S. Cl. .......................... 305/160; 305/178; 305/199; 305/114; 305/165; 305/193; 305/115
[58] Field of Search .................................. 305/160, 178, 305/179, 195, 199, 111, 114, 165, 168, 193, 137, 169, 115

[56] References Cited

U.S. PATENT DOCUMENTS

| | | | |
|---|---|---|---|
| 2,476,460 | 7/1949 | Smith | 305/167 |
| 2,592,541 | 4/1952 | Curtis | 305/167 |
| 3,472,563 | 10/1969 | Irgens | 305/195 |
| 3,680,925 | 8/1972 | Spivy | 305/168 |
| 3,711,165 | 1/1973 | Russ, Sr. | 305/178 |
| 3,756,668 | 9/1973 | Russ, Sr. | 305/179 |
| 3,900,231 | 8/1975 | Ohm | 305/178 |
| 4,818,041 | 4/1989 | Oertley | 305/137 |
| 4,957,472 | 9/1990 | Nakano | 305/178 |
| 5,769,512 | 6/1998 | Kautsch | 305/199 |

FOREIGN PATENT DOCUMENTS 1164116   10/1958   France ................................. 305/160

OTHER PUBLICATIONS

"Gates PolyTrac—The right Track for Snowmobile Action." The Gates Rubber Company, Feb. 1972.

*Primary Examiner*—D. Glenn Dayoan
*Assistant Examiner*—Long Bao Nguyen
*Attorney, Agent, or Firm*—Merchant & Gould P.C.

[57] ABSTRACT

A crawler belt apparatus includes a drive wheel having engaging teeth, a crawler belt having engaging projections engageable with the engaging teeth, and a plurality of discharge passages formed between root bottoms defined by the engaging projections, and top ends of the engaging teeth, for discharging foreign substances such as dirt and sand entered between the root bottoms and the top ends. The foreign substances passing through the discharge passages are not compressed by the drive wheel and hence do not become a solid mass.

4 Claims, 9 Drawing Sheets

CRAWLER BELT APPARATUS

BACKGROUND OF THE INVENTION

1. Field of the Invention

The present invention relates generally to an improvement in a crawler belt apparatus and more particularly to a crawler belt apparatus adapted to discharge foreign substances such as dirt and sand stuck between engaging projections of a crawler belt and engaging teeth of drive wheels thereof.

2. Description of the Related Art

Figure 9A:
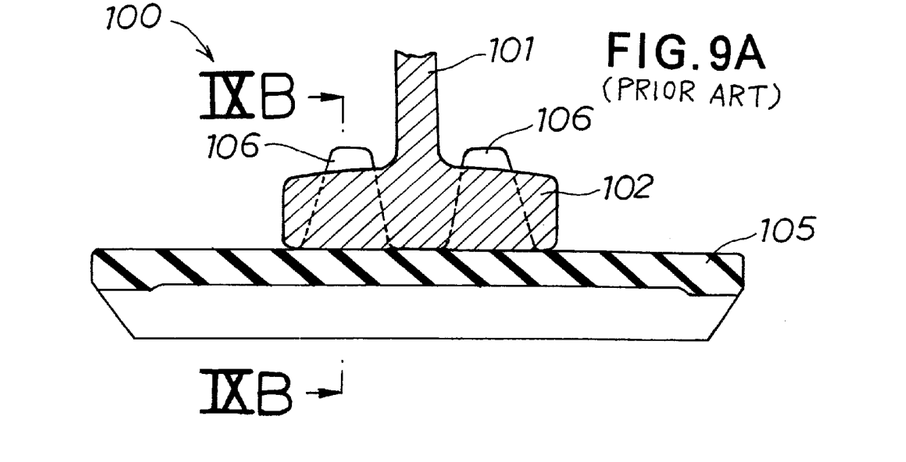
FIG. 9A to FIG. 9C are cross-sectional views illustrating a conventional crawler belt apparatus.
Figure 9B:
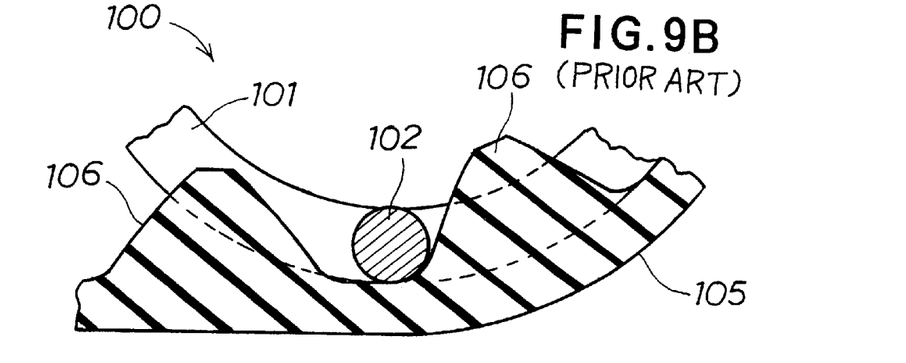
Figure 9C:
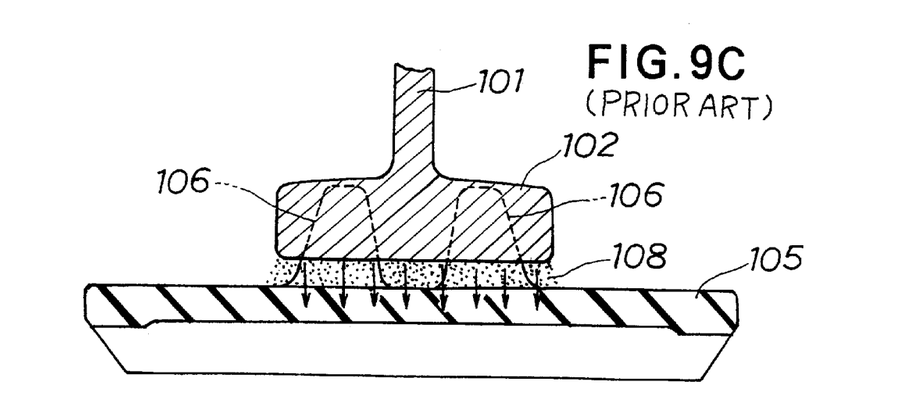

Normally, transport vehicles for use on rough terrain employ a crawler belt apparatus as shown in FIG. 9A to FIG. 9C hereof.

FIG. 9A is a sectional view taken transversely of a crawler belt and illustrating the engaging relationship between the belt and a drive wheel. FIG. 9B is a cross-sectional view taken along line IXB—IXB of FIG. 9A. FIG. 9C is illustrates the operation of the crawler belt and the drive wheel.

Crawler belt apparatus 100 is comprised of a drive wheel 101 having on an outer periphery thereof a plurality of engaging teeth 102, and a crawler belt 105 having on an inner periphery thereof two rows of longitudinally spaced engaging projections 106 for engagement with the engaging teeth 102. The crawler belt 105 is a rubber belt (without any reinforcing core cords). As the crawler belt apparatus 100 is used on rough terrain, foreign substances 108 such as dirt and sand often get caught between the engaging teeth 102 and the engaging projections 106. If the foreign substances 108 grow larger and turn into a solid mass, this strongly presses on the belt 105, whereby a tension applied to the crawler belt 105 becomes significantly large compared to a belt tension set upon assemblage of the crawler belt apparatus 100. This excessive tension shortens the life of the crawler belt 105 and hence is undesirable.

Moreover, if the foreign substances 108 are compressed and get stuck, it becomes difficult for the crawler belt 105 to deform vertically (in a direction of the thickness of the belt). As a result, influences of an uneven road surface are reflected directly upon a crawler body, thus deteriorating the drivability of a crawler vehicle.

SUMMARY OF THE INVENTION

With a view to overcome the foregoing problems, there is provided according to the present invention a crawler belt apparatus having a drive wheel and a crawler belt engageable with the drive wheel, comprising a plurality of engaging teeth disposed on an outer periphery of the drive wheel, a plurality of engaging projections disposed on an inner periphery of the crawler belt along the length thereof and being engageable with the engaging teeth, and a plurality of discharge passages formed between root bottoms defined by adjacent two of the engaging projections and top ends of the engaging teeth, for discharging foreign substances.

In the crawler belt apparatus thus arranged, foreign substances such as dirt and sand entered between the engaging projections of the crawler belt and the engaging teeth of the drive wheel can be discharged easily through the discharge passages formed between the top ends of the engaging teeth and the root bottoms defined by two adjacent engaging projections. Consequently, foreign substances can be prevented from growing in amount and getting caught between the top ends of the engaging teeth and the inner peripheral surface of the crawler belt to become a solid mass. As a result, it becomes possible to keep a tension applied to the crawler belt substantially constant and maintain the engagement between the drive wheel and the crawler belt in a desired condition. Moreover, because no foreign substances get caught and become a solid mass, the crawler belt is rendered capable of deforming in accordance with a rugged road surface and absorbing shocks resulted from running on the rugged road surface. The crawler belt apparatus thus achieves stable crawler running.

In one preferred form, the drive wheel has an increased diameter portion provided centrally of an outer periphery thereof and reduced diameter portions provided on both sides of the increased diameter portion while the reduced diameter portions and the root bottoms jointly define spaces therebetween for serving as the discharge passages for discharging foreign substances. That is, the increased diameter portion is provided on a widthwise center of the outer periphery of the drive wheel to thereby provide the discharge passages of equal length on both sides of the increased diameter portion. As a result, foreign substances can be discharged uniformly through the discharge passages on both sides of the increased diameter portion. Further, since only the increased diameter portion of the drive wheel is abutted against the inner periphery of the crawler belt, least force is applied to compress the foreign substances against the inner periphery of the crawler belt. As a result, the engagement relationship between the drive wheel and the crawler belt is not adversely influenced by the foreign substances and can be maintained in a good condition.

In another preferred form, the engaging projections of the crawler belt have a height larger than a height of the engaging teeth of the drive wheel while the top ends of the engaging projections are abutted against surfaces of the root bottoms of the engaging teeth to thereby provide the discharge passages. The discharge passages pass through the belt transversely thereof, whereby the foreign substances can be discharged smoothly. Additionally, these discharge passages are simple in construction.

In yet another preferred form, the engaging projections of the crawler belt have a height larger than a height of the engaging teeth of the drive wheel while the engaging teeth are fitted between adjacent two engaging projections in a wedge-like fashion to thereby provide the discharge passages. These discharge passages pass through the belt transversely thereof, as in the foregoing arrangement, and can discharge foreign substances smoothly.

BRIEF DESCRIPTION OF THE DRAWINGS

Preferred embodiments of the present invention will be described hereinbelow, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
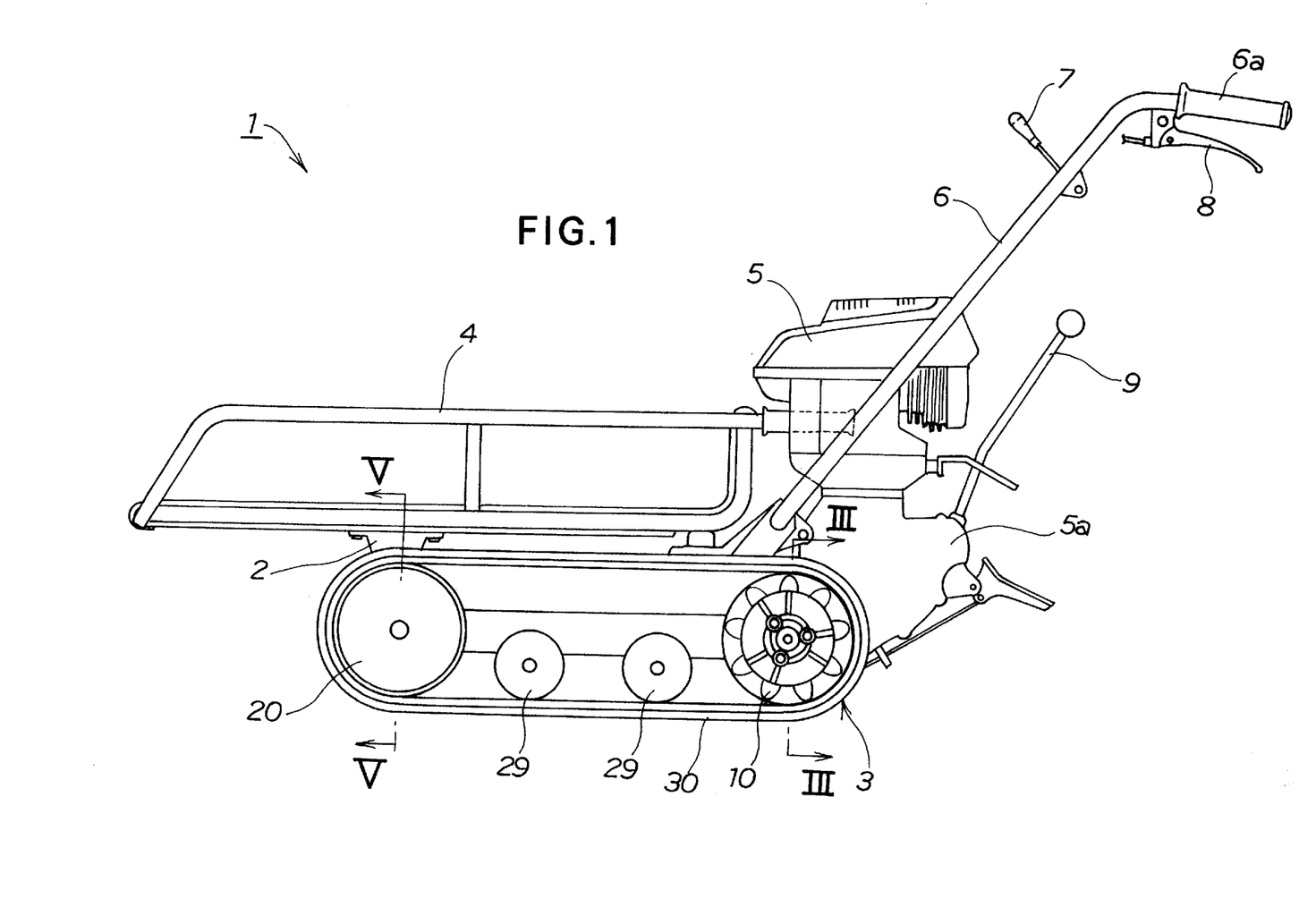
FIG. 1 is a side elevational view of a transportation crawler vehicle employing a crawler belt apparatus according to the present invention.

Referring to FIG. 1, a transportation crawler vehicle 1 is comprised of two groups of crawler belt apparatuses 3, 3 (only one shown) disposed on right and left (front-rear of the sheet) sides of a body frame 2, a bed 4 mounted to an upper part of the body frame for supporting loads thereon, an engine 5 with a transmission 5a mounted to a rear part of the body frame 2, and a handle 6 extending obliquely upwardly rearwardly from the body frame 2.

Each crawler belt apparatus 3 is comprised of a drive wheel 10 mounted to a rear part of the body frame 2, an idling wheel 20 mounted to a frontal part of the body frame 2, and a crawler belt 30 disposed between the drive wheel 10 and the idling wheel 20.

Reference numeral 6a denotes a handle grip. Designated by reference numeral 7 is a clutch lever. Reference numerals 8, 9 designate a brake lever and a shift lever, respectively. Reference numerals 29, 29 denote tensioning rollers.

Figure 2:
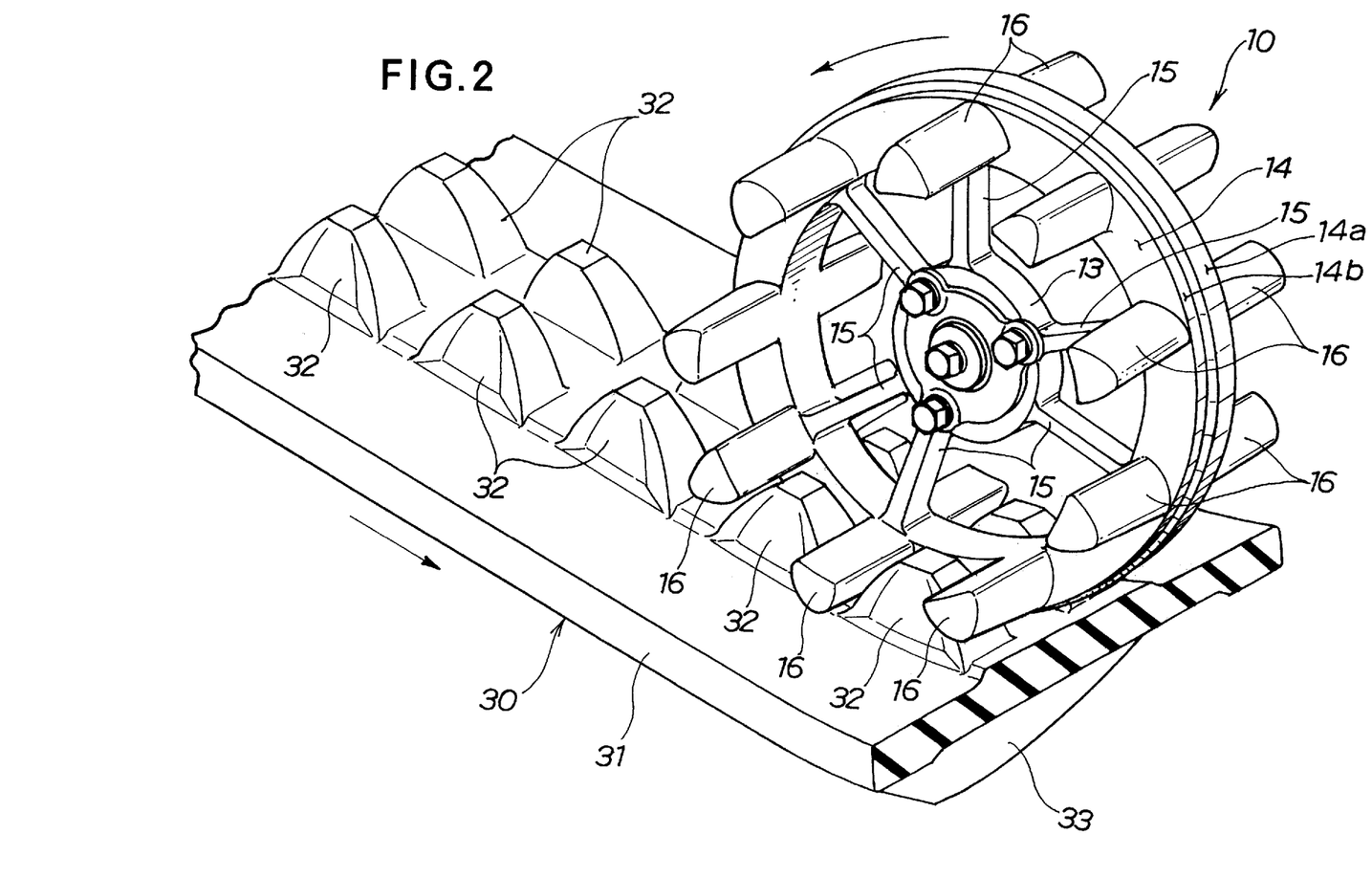
FIG. 2 is a perspective view illustrating an integral part of the crawler belt apparatus.

Turning to FIG. 2, an integral part of the crawler belt 30 according to the present invention is shown schematically. The drive wheel 10 comprises a boss portion 13, a rim 14, a plurality of arms 15 connecting the boss portion 13 and the rim 14, and a plurality of engaging teeth 16 projecting from both sides of the rim 14, which are molded integrally. The engaging teeth 16 are provided on an outer periphery of the drive wheel 10 at a predetermined pitch and take the form of bars extending transversely of the drive wheel.

The crawler belt 30 is made from a resilient material such as rubber and comprises a looped belt body 31, a plurality of engaging projections 32 rising from an inner peripheral surface of the belt body 31, and a plurality of treads 33 of a given pattern disposed on the outer peripheral surface of the belt body 31, which are all formed integrally. The engaging projections 32 are provided at a predetermined pitch in two rows.

Figure 3:
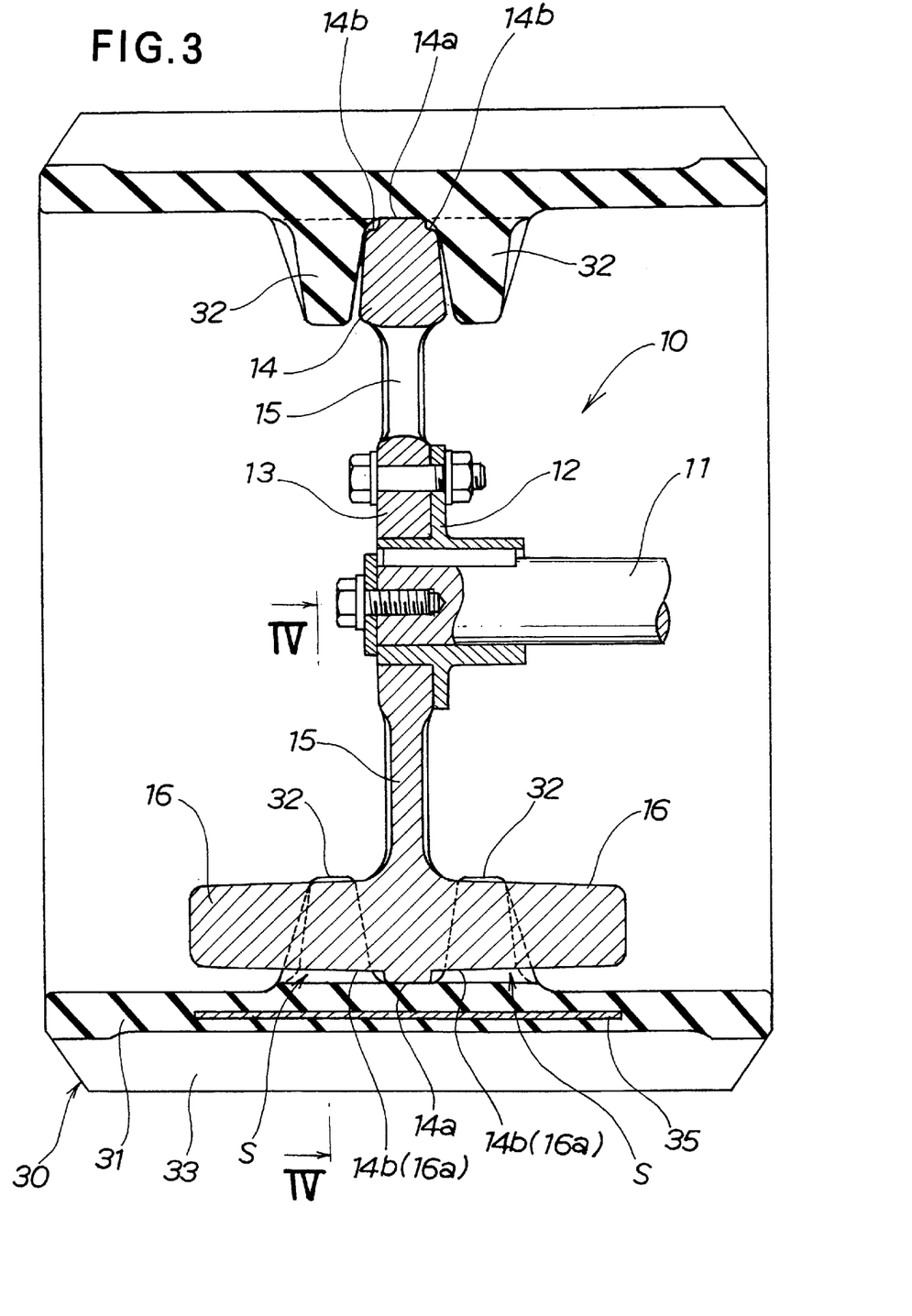
FIG. 3 is an enlarged cross-sectional view taken along line III—III of FIG. 1.

Reference is now had to FIG. 3 showing a drive shaft 11 with a hub 12 mounted thereto and the boss portion 13 mounted to the hub 12.

The rim 14 is positioned transversely centrally of the wheel and has an increased diameter portion 14a of narrow width at an outer periphery thereof. On both sides of the increased diameter portion 14a, there are provided reduced diameter portions 14b, 14b of generally convex cross section. The increased diameter portion 14a is in contact with the inner peripheral surface of the belt body 31. The rim 14 is fitted between adjacent two of the engaging projections 32, 32 arranged in two rows along the length of the belt and thus restricted of its swinging movement in a transverse direction (right-left direction in the figure).

The engaging teeth 16 have radial top ends 16a (hereinafter simply called "top ends 16a") which are flush with the reduced diameter portions 14b and extend in a transverse direction (right-left direction in FIG. 3) relative to the drive wheel 10. Hereinafter, the term "reduced diameter portions 14b" should be construed as including the "top ends 16a" of the engaging teeth 16.

Figure 4:
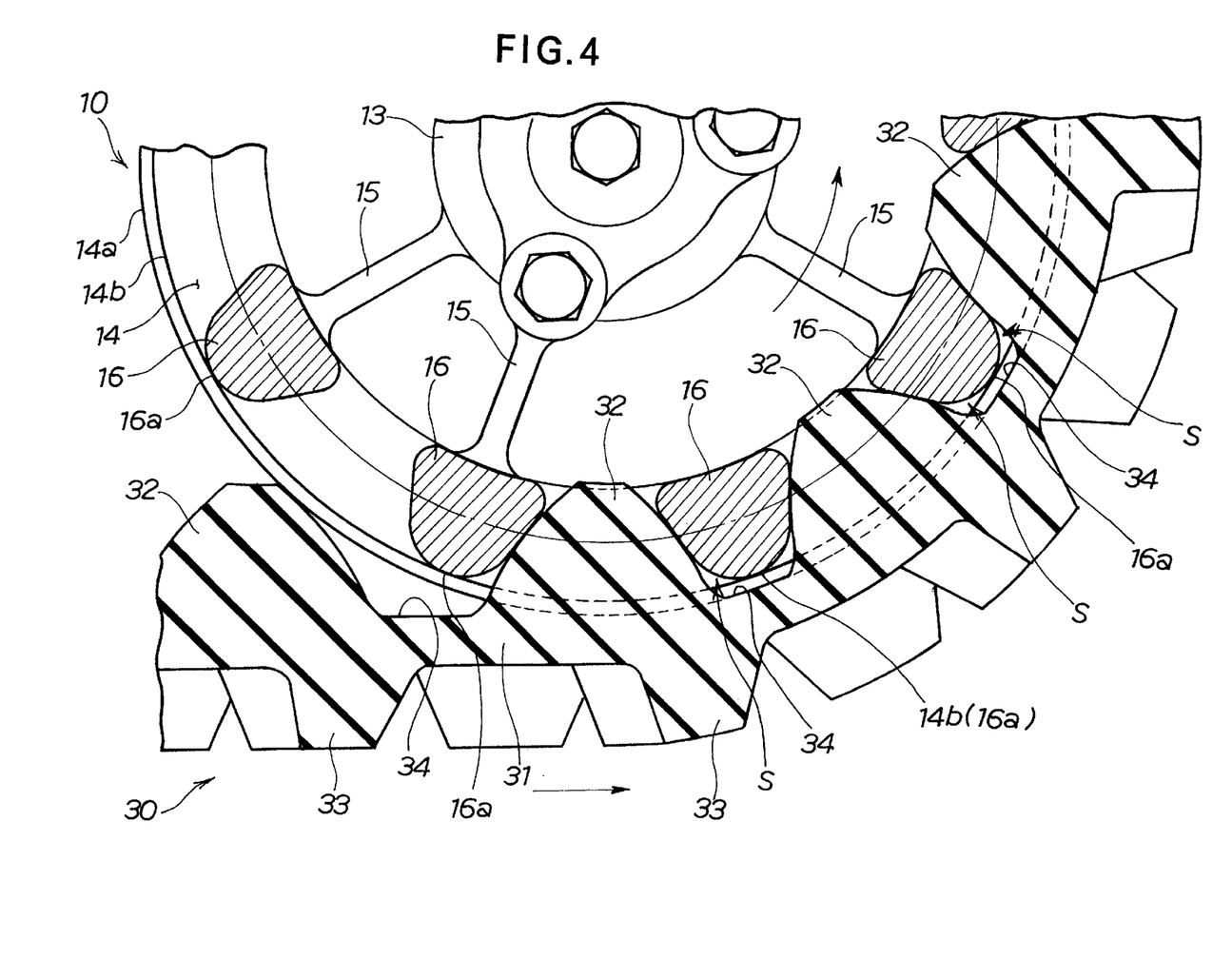
FIG. 4 is a cross-sectional view taken along line IV—IV of FIG. 3.

Referring now to FIG. 4, the engaging portions 32 take the form of projections having a cross section of generally involute gear as seen in a longitudinal direction (right-left direction in the figure).

The engaging teeth 16 are of substantially triangular cross section with the top ends 16a being circular as seen laterally so that they can be fitted into root bottoms 34 defined between two adjacent engaging projections 32, 32. It is desirable that the engaging teeth 16 are fitted between the adjacent two engaging projections 32, 32 in a wedge-like fashion.

A discharge passage for discharging foreign substances such as dirt is formed between the top ends 16a of the engaging teeth 16 (reduced diameter portions 14b) and surfaces of the root bottoms 34 defined between the two adjacent engaging projections 32, 32 (inner peripheral surface of the crawler belt 30).

Specifically, the discharge passage comprises a space S defined between the reduced diameter portions 14b of the rim 14 (top ends 16a of the engaging teeth 16) and the surfaces of the root bottoms 34. The engaging projections 32 have a height larger than a height of the engaging teeth 16.

Returning to FIG. 3, the belt body 31 has a plurality of reinforcing core cords 35 embedded therein at a predetermined pitch along the length thereof and extending transversely of the belt (in a right-left direction in the figure). The core cords 35 have a length substantially equal to a dimension between end surfaces of the right and left engaging teeth 16, 16 (a width dimension of an idling wheel 20 to be described below). That is, the crawler belt 30 is reinforced by the core cords 35 only at a transverse center thereof. As a result, the center can hardly deform transversely. Therefore, the crawler belt 30 can hardly deform on a rugged surface of rough terrain, whereby the space (discharge passage) S for discharging foreign substances can be maintained in its normal state.

Figure 5:
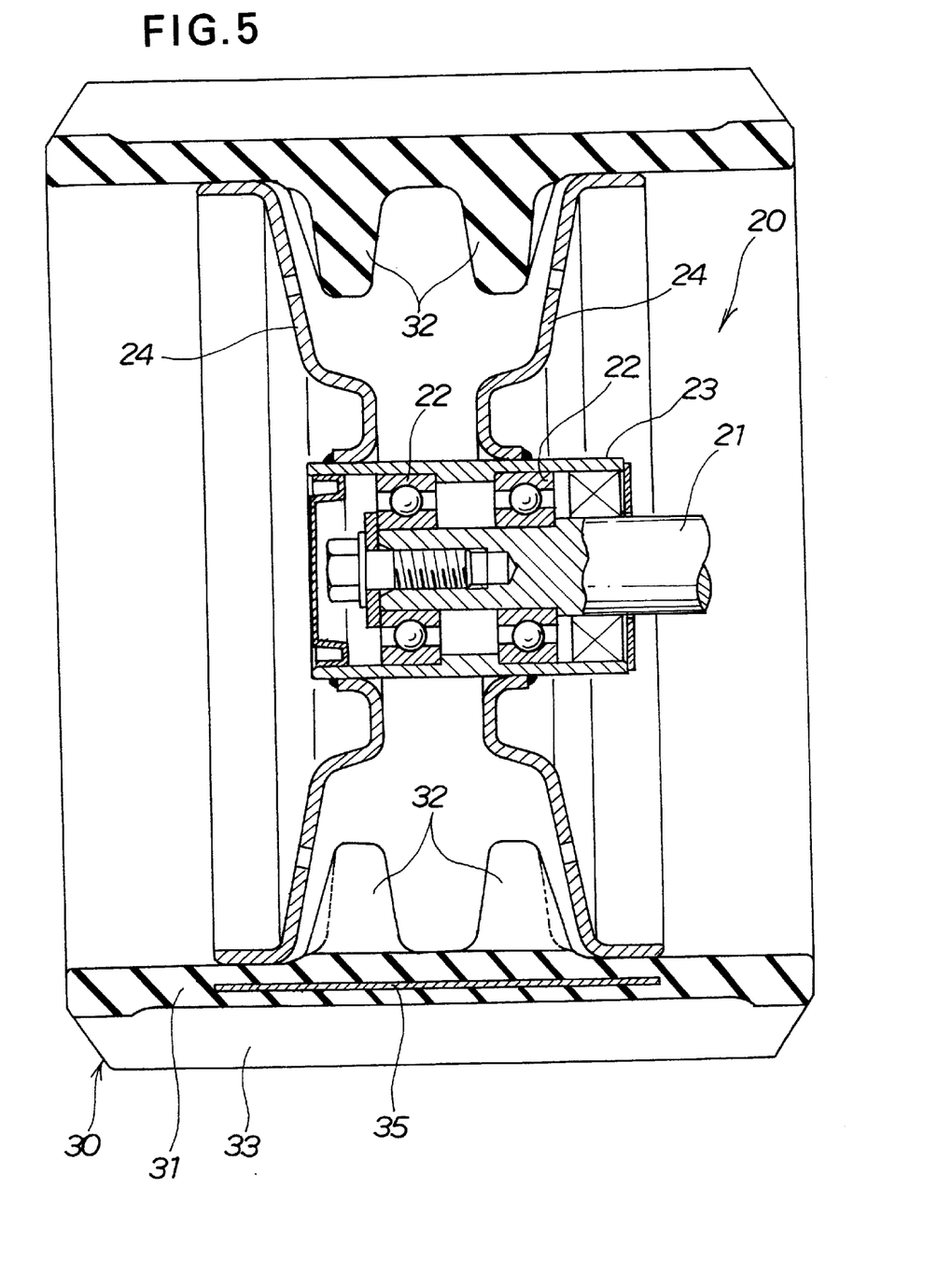
FIG. 5 is an enlarged cross-sectional view taken along line V—V of FIG. 1.

Turning now to FIG. 5, the idling wheel 20 has a generally bobbin-like configuration. The idling wheel 20 is comprised of a boss portion 23 rotatably disposed on a driven shaft 21 by means of bearings 22, 22, and wheel portions 24, 24 of dish-like cross section disposed on transverse (right and left) ends of the boss portion 23.

The right and left wheel portions 24, 24 are spaced from each other such that they surround from sideways the engaging projections 32 arranged in two rows longitudinally of the belt. Since there is no member fitted in the root bottoms 34 (see FIG. 4) formed between the adjacent two engaging projections 32, 32, it is therefore not necessary to provide the idling wheel 20 with a discharge passage for discharging foreign substances.

Next, having reference to FIG. 6A and FIG. 6B, discussion will be made as to the operation of the crawler belt apparatus 3 arranged as explained above.

Figure 6A:
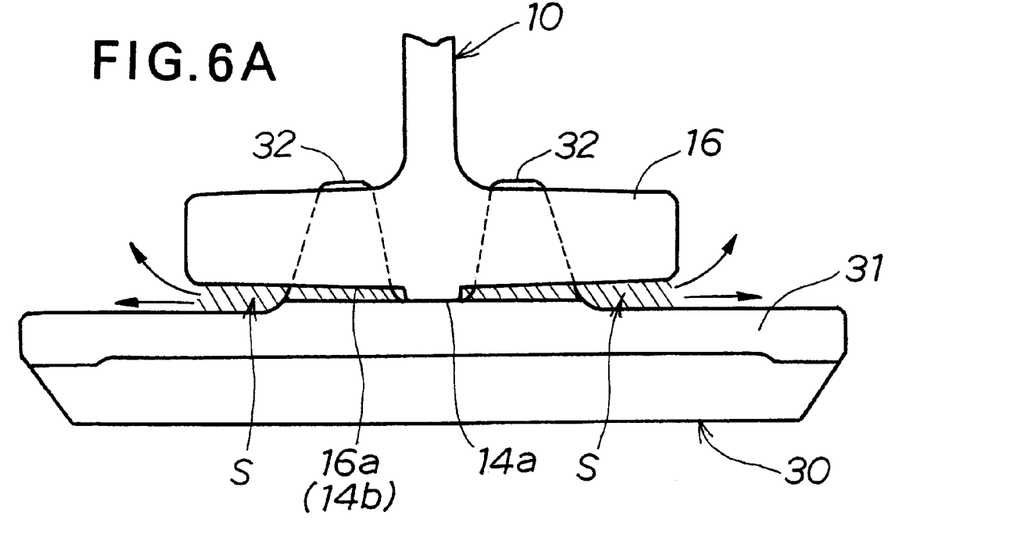
FIG. 6A and FIG. 6B illustrate the operation of the crawler belt apparatus, FIG. 6A being a schematic transverse section of a belt of the apparatus, FIG. 6B being a schematic side view of the belt.
Figure 6B:
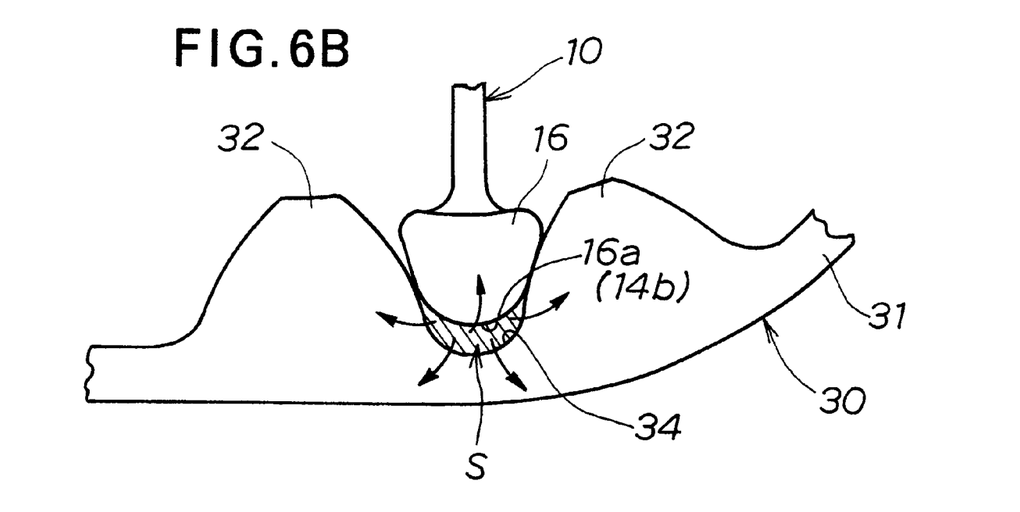

In FIGS. 6A and 6B, a space (discharge passage) S designated by hatchings is opened in longitudinal and transverse directions relative to the belt. Therefore, foreign substances such as dirt and sand moving near the bottoms 34 formed between the adjacent two engaging projections 32, 32, and the top ends 16a of the engaging teeth 16 (reduced diameter portions 14b) can get out freely through the space S. As a result, it becomes possible to prevent the foreign substances from getting caught between the top ends 16a of the engaging teeth 16 and inner peripheral surface of the crawler belt 30 and from growing larger and becoming a solid mass. Since the foreign substances do not get caught and become a solid mass, a tension applied to the crawler belt 30 remains unchanged.

Since only the increased diameter portion 14a of the drive wheel 10 is brought into abutment against the inner peripheral surface of the crawler belt 30, the drive wheel 10 as a whole does not compress the foreign substances against the inner peripheral surface of the crawler belt 30, whereby the foreign substance compressing force can be reduced.

Due to the reasons explained above, the engagement relations between the drive wheel 10 and the crawler belt 30 are held in a desirable condition.

With the increased diameter portion 14a being positioned transversely centrally of the drive wheel 10, the spaces (discharge passages) S at both sides of the increased diameter portion 14a are equidistantly spaced from each other. Thus, the foreign substances entered into the spaces S can be discharged generally uniformly.

Since the foreign substances entered between the top ends 16a of the engaging teeth 16 and the inner peripheral surface of the crawler belt 30 do not stay there as a solid mass, the crawler belt 30 can deform in accordance with bumpy road surfaces to thereby absorb shocks or vibrations resulting from running a crawler on such road surfaces.

In the embodiment just described, the crawler belt apparatus 3 is featured in the discharge passages provided between the top ends 16a of the engaging teeth 16 and the surfaces of the root bottoms 34 formed between the adjacent two engaging projections 32, 32 for discharging foreign substances. As can be readily appreciated by those skilled in the art, alterations of the apparatus 3 are possible. For example, the apparatus 3 may be arranged as shown in FIGS. 7A and 7B or FIGS. 8A and 8B.

In FIGS. 7A, 7B, 8A and 8B, like reference numerals are used for corresponding parts shown in FIGS. 1–6 and their detailed discussion will therefore be omitted.

Figure 7A:
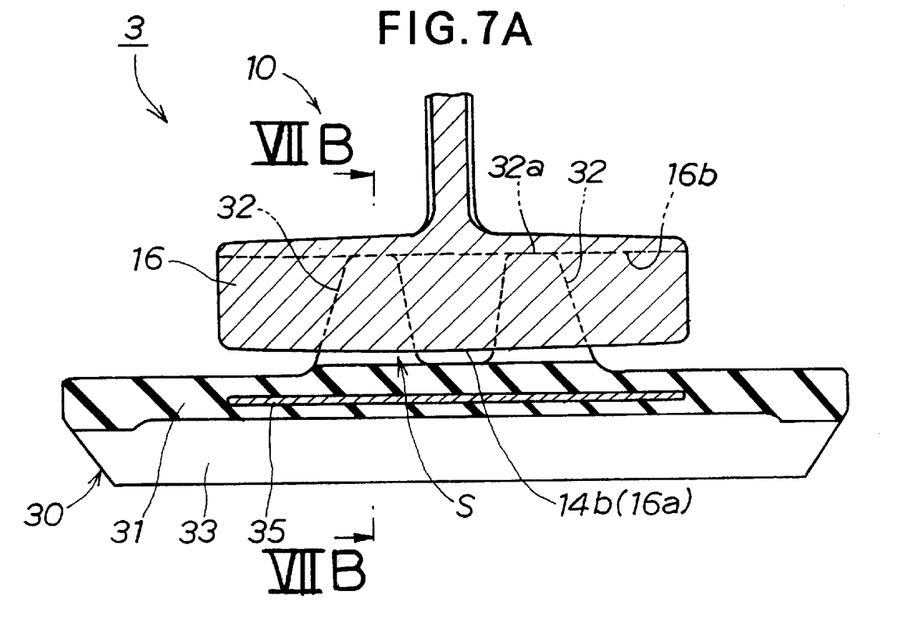
FIG. 7A and FIG. 7B illustrate an alteration of the crawler belt apparatus, FIG. 7A being a transverse sectional view showing the engagement relationship between a crawler belt and a drive wheel of the apparatus, FIG. 7B being a cross-sectional view taken along line VIIB—VIIB of FIG. 7A.
Figure 7B:
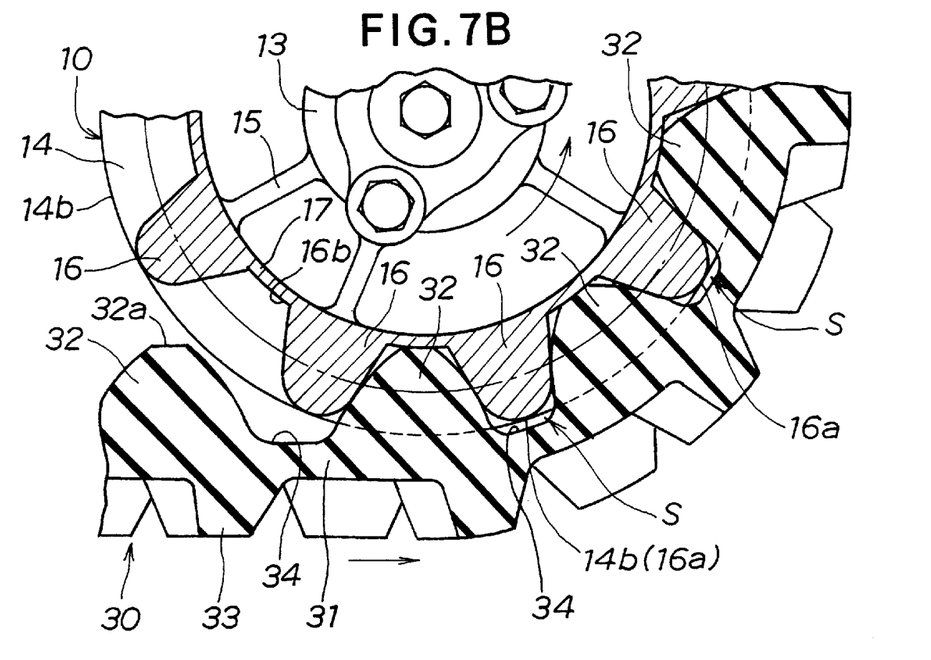

Shown in FIGS. 7A and 7B is a first alteration of the crawler belt apparatus 3. More specifically, FIG. 7A is a transverse cross-sectional view illustrating an engagement relationship between a crawler belt 30 and a drive wheel 10 while FIG. 7B is a cross-sectional view taken along line VIIB—VIIB of FIG. 7A.

The crawler belt apparatus 3 according to the first alteration includes a plurality of engaging projections 32 having a height larger than a height of engaging teeth 16 of a drive wheel 10. Top ends 32a of the engaging projections 32 are brought into abutting engagement with tooth bottoms 16b formed between adjacent two engaging teeth 16, 16 to thereby provide spaces (discharge passages) S.

Specifically, the engaging teeth 16 are interconnected at radially proximal ends thereof by means of an annular member 17. An outer peripheral surface of the annular member 17 acts as tooth bottoms 16b of the engaging teeth 16. In this case, the increased diameter portion 14a of the rim 14 (see FIG. 3) is not required.

As explained above, in the first alteration, spaces (discharge passages) S extending transversely of the belt are formed between the top ends 16a of the engaging teeth 16 and the root bottoms 34 defined by the adjacent two engaging projections 32, 32. As a result, foreign substance discharge efficiency can be increased, because the foreign substances can be discharged quickly through the spaces S.

Figure 8A:
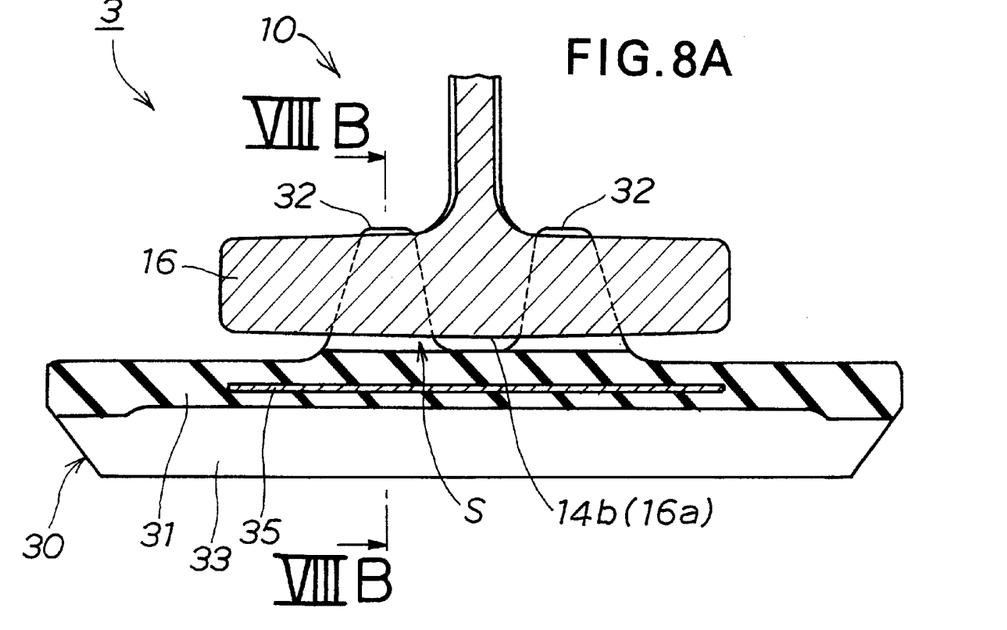
FIG. 8A and FIG. 8B illustrate a further alteration of the crawler belt apparatus, FIG. 8A being a transverse sectional view showing the engagement relationship between a crawler belt and a drive wheel of the apparatus, FIG. 8B being a cross-sectional view taken along line VIIIB—VIIIB of FIG. 8A.
Figure 8B:
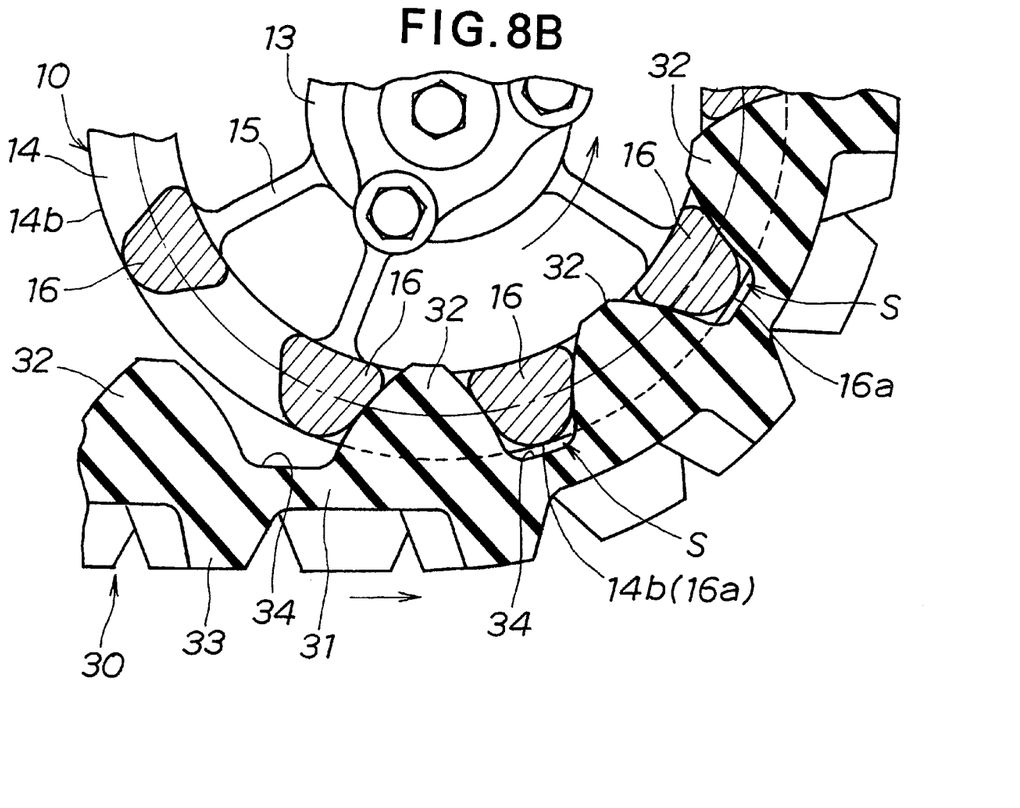

FIG. 8A and FIG. 8B illustrate a second alteration of the crawler belt apparatus 3. Specifically, FIG. 8A is a transverse sectional view showing a mode of engagement of a crawler belt 30 and a drive wheel 10 whilst FIG. 8B is a cross-sectional view taken along line VIIIB—VIIIB of FIG. 8A.

The crawler belt apparatus 3 according to the second alteration includes a plurality of engaging projections 32 having a height larger than a height of engaging teeth 16 of a drive wheel 10. The engaging teeth 16 are fitted in a wedge-like fashion between adjacent two engaging projections 32, 32 to thereby provide spaces (discharge passages) S.

Specifically, the engaging teeth 16 are fitted in a wedge-like fashion between adjacent two engaging teeth 32, 32 to thereby provide spaces S between top ends 16a of the engaging teeth 16 and the surfaces of the root bottoms 34. In this case, the increased diameter portion 14a of the rim 14 (see FIG. 3) is not required.

In the second alteration, spaces (discharge passages) S extending transversely of the belt are formed between the top ends 16a of the engaging teeth 16 and the bottoms 34 defined by the adjacent two engaging projections 32, 32. As a result, foreign substance can be discharged smoothly via the spaces S.

As thus far explained in detail, the crawler belt apparatus according to the present invention has the discharge passages disposed between the top ends of the engaging teeth of the drive wheel and the root bottoms formed between the two adjacent engaging projections for discharging foreign substances such as dirt and sand. Thus, the foreign substances entered between the engaging projections of the crawler belt and the engaging teeth of the drive wheel can be discharged easily through the discharge passages. Consequently, it becomes possible to avoid such instances where foreign substances get caught between the top ends of the engaging teeth and the inner peripheral surface of the crawler belt and grow larger to become a solid mass. As a result, a tension applied to the crawler belt remains unchanged and the engagement between the drive wheel and the crawler belt is maintained in a good condition.

Further, since foreign substances do not get caught in the discharge passages, the crawler belt can deform in accordance with a rugged road surface, thus absorbing vibrations resulting from running the crawler on such a road surface. As a result, the crawler belt apparatus achieves stable crawler running.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A crawler belt apparatus, comprising:
   a drive wheel having a plurality of engaging teeth disposed on opposite side surfaces thereof at a predetermined interval closely to and along a periphery thereof, said teeth each extending outwardly from said opposite side surfaces and having top ends;
   a crawler belt trained around said drive wheel and having two parallel rows of engaging projections disposed on an inner peripheral surface thereof along the length thereof and being engageable with said engaging teeth, said crawler belt having root bottom surfaces between adjacent two of said projections of each row; and a plurality of discharge passages each formed as a space between said root bottom surface defined by adjacent two of said engaging projections and said top end of one of said engaging teeth when said one of said engaging teeth is fully engaged with said two of said engaging projections, said discharge passages for discharging foreign substances.

2. A crawler belt apparatus according to claim 1, wherein said drive wheel has an increased diameter portion provided centrally of the periphery thereof and reduced diameter portions provided on both sides of said increased diameter portion, said reduced diameter portions and said root bottoms defining spaces therebetween for serving as said discharge passages.

3. A crawler belt apparatus according to claim 1, wherein said engaging projections of said crawler belt have a height larger than a height of said engaging teeth of said drive wheel, and said top ends of said engaging projections are abutted against surfaces of root bottoms of said engaging teeth to thereby provide said discharge passages.

4. A crawler belt apparatus according to claim 1, wherein said engaging projections of said crawler belt have a height larger than a height of said engaging teeth of said drive wheel, and said engaging teeth wedge between adjacent two of said engaging projections to thereby provide said discharge passages.

* * * * *